US008792713B2

(12) United States Patent
Adams et al.

(10) Patent No.: US 8,792,713 B2
(45) Date of Patent: Jul. 29, 2014

(54) DERIVING MULTIDIMENSIONAL HISTOGRAM FROM MULTIPLE PARALLEL-PROCESSED ONE-DIMENSIONAL HISTOGRAMS TO FIND HISTOGRAM CHARACTERISTICS EXACTLY WITH O(1) COMPLEXITY FOR NOISE REDUCTION AND ARTISTIC EFFECTS IN VIDEO

(75) Inventors: Dennis Adams, Madison, WI (US); Nikolaos Georgis, San Diego, CA (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 144 days.

(21) Appl. No.: 13/481,893

(22) Filed: May 28, 2012

(65) Prior Publication Data
US 2013/0287298 A1  Oct. 31, 2013

Related U.S. Application Data
(60) Provisional application No. 61/638,783, filed on Apr. 26, 2012.

(51) Int. Cl.
*G06K 9/00* (2006.01)
(52) U.S. Cl.
USPC .......................................................... 382/168
(58) Field of Classification Search
CPC ........... G06T 2207/20028; G06T 2207/20032; G06K 9/40
USPC ....................................................... 382/168
See application file for complete search history.

(56) References Cited

U.S. PATENT DOCUMENTS

| | | | | |
|---|---|---|---|---|
| 5,835,622 A | * | 11/1998 | Koljonen et al. | 382/146 |
| 7,031,543 B2 | * | 4/2006 | Cheng et al. | 382/254 |
| 7,822,288 B2 | | 10/2010 | Weiss | |
| 7,889,922 B2 | | 2/2011 | Fluck | |
| 7,889,923 B1 | * | 2/2011 | Carr et al. | 382/168 |
| 2006/0110063 A1 | * | 5/2006 | Weiss | 382/262 |
| 2007/0183682 A1 | * | 8/2007 | Weiss | 382/261 |
| 2008/0298680 A1 | * | 12/2008 | Miller et al. | 382/168 |

FOREIGN PATENT DOCUMENTS

WO   2008151026   12/2008

OTHER PUBLICATIONS

Ben Weiss, "Fast Median and Bilateral Filtering", www.shellandslate.com/fastmedian.html, (2006).
David Cline, Kenric B. White, Parris K. Egbert, "Fast 8-Bit Median Filtering Based on Separability", IEEE V-281-284 (ICIP 2007).
Simon Perrault, Patrick Herbert, "Median Filtering in Constant Time", IEEE transaction on Image Processing, pp. 2389-2394 (2007).
Steven W. Smith, "The Scientist and Engineer's Guide to Digital Signal Processing, chapter 24: liner Image Processing", www.dspguide.com/ch24/3.htm, printed from internet May 7, 2012.

\* cited by examiner

*Primary Examiner* — Utpal Shah
(74) *Attorney, Agent, or Firm* — John L. Rogitz

(57) ABSTRACT

One dimensional (1D) histograms, one for each row of an image, are determined simultaneously and in parallel with each other to achieve an O(1) time complexity, and are then added to determine a two dimensional (2D) histogram from which desired characteristic values such as median, minimum, and maximum can be determined exactly as opposed to merely being estimated. The characteristic value can be applied to the image to reduce noise or to achieve artistic effects in the image.

17 Claims, 4 Drawing Sheets

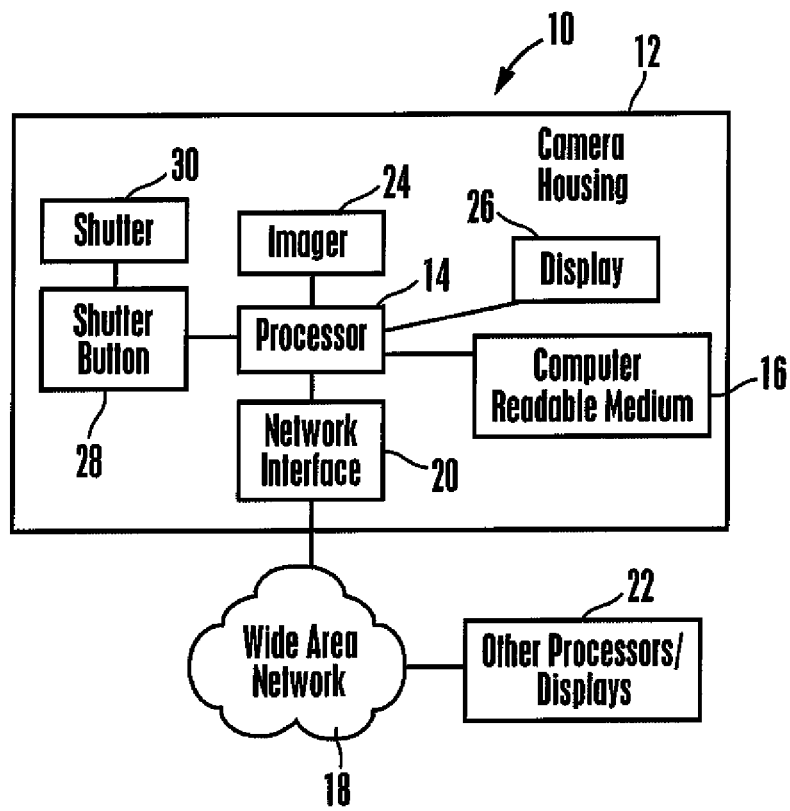
Figure 1
Figure 2
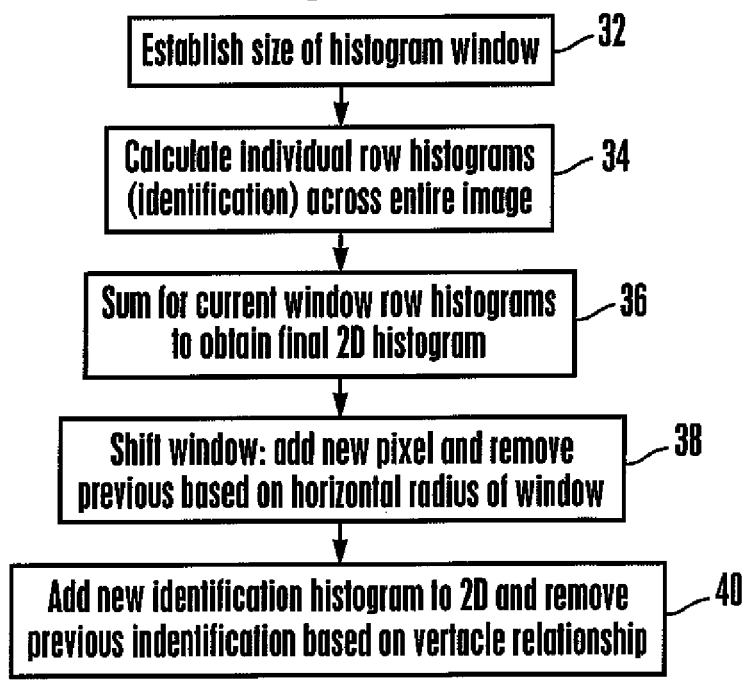

Figure 4
non-rectangular kernel
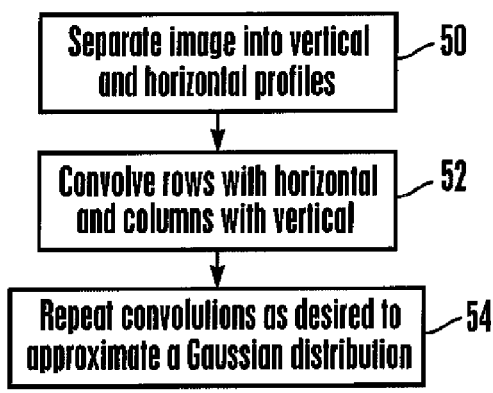
Figure 5
median calculation
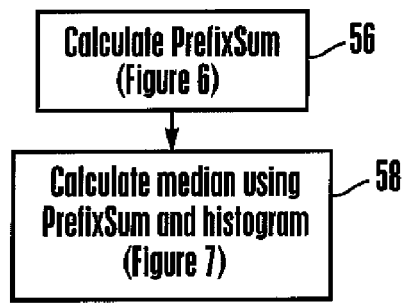
Figure 6
1) Calculate Prefix Sum given a Histogram
Final 2D Histogram obtained by summing all 1D histograms
| 10 | 11 | 11 | 11 | 6 | 6 | 3 | 6 | — 60
Calculate Prefix Sum by adding every histogram bin to the sum of the previous.
| 10 | 11+10 | 11+10+11 | 11+10+11+11 | 6+10+11+11+11 | 6+10+11+11+11+6 | 3+10+11+11+11+6+6 | 6+10+11+11+11+6+6+3 | — 62
PrefixSum-final result
| 10 | 21 | 32 | 43 | 49 | 55 | 58 | 64 | — 64

Figure 7

2) Calculate Median given Histogram and Prefix Sum

68 → | 0 | 1 | 2 | 3 | 4 | 5 | 6 | 7 |   Bin

70 → | 10 | 11 | 11 | 11 | 6 | 6 | 3 | 6 |   Histogram

64 → | 10 | 21 | 32 | 43 | 49 | 55 | 58 | 64 |   Prefix Sum

- Set Median Value = Total bin sum *0.5 = 64* 0.5 = 32 ("working sum")
- Median is calculated in parallel by evaluating the following Boolean expression for every bin:
  - (Median Value <= Prefix Sum) AND (Prefix Sum - Histogram ≤ Median Value)

| F | F | T | F | F | F | F |

\ 74

- The bin that results in TRUE is the Median
- In the example above the Median is 2
  - This is because (32 <= 32) AND (32 - 11 <32).
- *Min and Max are calculated in a similar way by using 0 and 1 instead of 0.5 above*

DERIVING MULTIDIMENSIONAL HISTOGRAM FROM MULTIPLE PARALLEL-PROCESSED ONE-DIMENSIONAL HISTOGRAMS TO FIND HISTOGRAM CHARACTERISTICS EXACTLY WITH O(1) COMPLEXITY FOR NOISE REDUCTION AND ARTISTIC EFFECTS IN VIDEO

RELATED APPLICATIONS

Priority is claimed from U.S. provisional application 61/638,783, filed Apr. 26, 2012, incorporated herein by reference.

FIELD OF THE INVENTION

The present application relates generally to deriving multidimensional histograms from multiple parallel-processed one-dimensional histograms to find histograms characteristics such as a median for noise reduction and artistic effects in video processing.

BACKGROUND OF THE INVENTION

To reduce noise in digital images, and/or to effect artistic changes to the images, a filtering technique is used in which pixel values are replaced by median values. The median values are typically derived from a histogram of the image. A histogram is a representation of the frequency with which particular pixel values appear in the image (or image subset known as a "window") of interest. To reduce the effects of noise, small windows typically are used, whereas to implement artistic effects, larger windows are used.

In any case, considerable computational effort and time can be spent calculating the median of each window even when advantageously using a histogram. Not surprisingly, methods to reduce computational complexity have been introduced, including by Perreault et al. in "Median Filtering in Constant Time", *IEEE Transactions on Image Processing*, pages 2389-2394 (2007). Perreault breaks down the two-dimensional histogram calculation into one-dimensional columnar calculations to achieve O(1) complexity, but as understood herein, the calculations in Perreault are sequential, prolonging processing time.

SUMMARY OF THE INVENTION

Accordingly, a computer which may be implemented in a camera includes a processor and a computer readable storage medium accessible to the processor and bearing instructions executable by the processor to cause the processor to receive an image and to generate plural one-dimensional histograms using respective rows of pixel values in the image. The one-dimensional histograms are generated simultaneously in parallel with each other. The processor generates a two-dimensional histogram using the one-dimensional histograms and determines a characteristic value of the two-dimensional histogram. The processor applies the characteristic value to the image to change at least one pixel value of the image.

In example embodiments the characteristic value is a median, or a maximum, or a minimum. In some implementations pixels represented in the two-dimensional histogram are changed to respective median values. The characteristic value can be determined using first and second evaluations of each bin element of a one dimensional histogram. In one example, the first evaluation includes determining whether a working sum that is based on a sum of pixel values is less than or equal to a prefix sum value for a bin element, and the second evaluation includes determining whether a difference between the prefix sum value for a bin element and a histogram value for a bin element is less than or equal to the working sum. The characteristic value is that value returning "true" for both evaluations. The prefix sum may be determined by adding each histogram bin in the two-dimensional histogram to a sum of the previous bin and note that prefix sums of each one dimensional histogram may be added together in parallel and simultaneously with determining the one dimensional histograms. In example embodiments the two-dimensional histogram is circular or ovular, and is generated by summing weighted versions of the one-dimensional histograms.

In another aspect, a method includes determining one dimensional (1D) histograms, one for each row of an image, simultaneously and in parallel with each other to achieve an O(1) time complexity. The method includes adding the 1D histograms together to determine a two dimensional (2D) histogram, and determining at least one desired characteristic value from the 2D histogram exactly as opposed to merely being estimated.

In another aspect, an imaging assembly includes an imager, a processor receiving signals from the imager representing at least one image, and a computer readable storage medium accessible to the processor and bearing instructions which when executed by the processor cause the processor to determine one dimensional (1D) histograms based on the image simultaneously with each other. The processor determines a two dimensional (2D) histogram from the 1D histograms.

The details of the present invention, both as to its structure and operation, can be best understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a flow chart of example overall logic;

FIG. 4 is a flow chart of example logic for determining a non-rectangular kernel;

FIG. 5 is a flow chart for determining a median value; and

FIGS. 6 and 7 are schematic diagrams illustrating the steps of FIG. 5.

DETAILED DESCRIPTION OF THE PREFERRED EMBODIMENT

Figure 3:
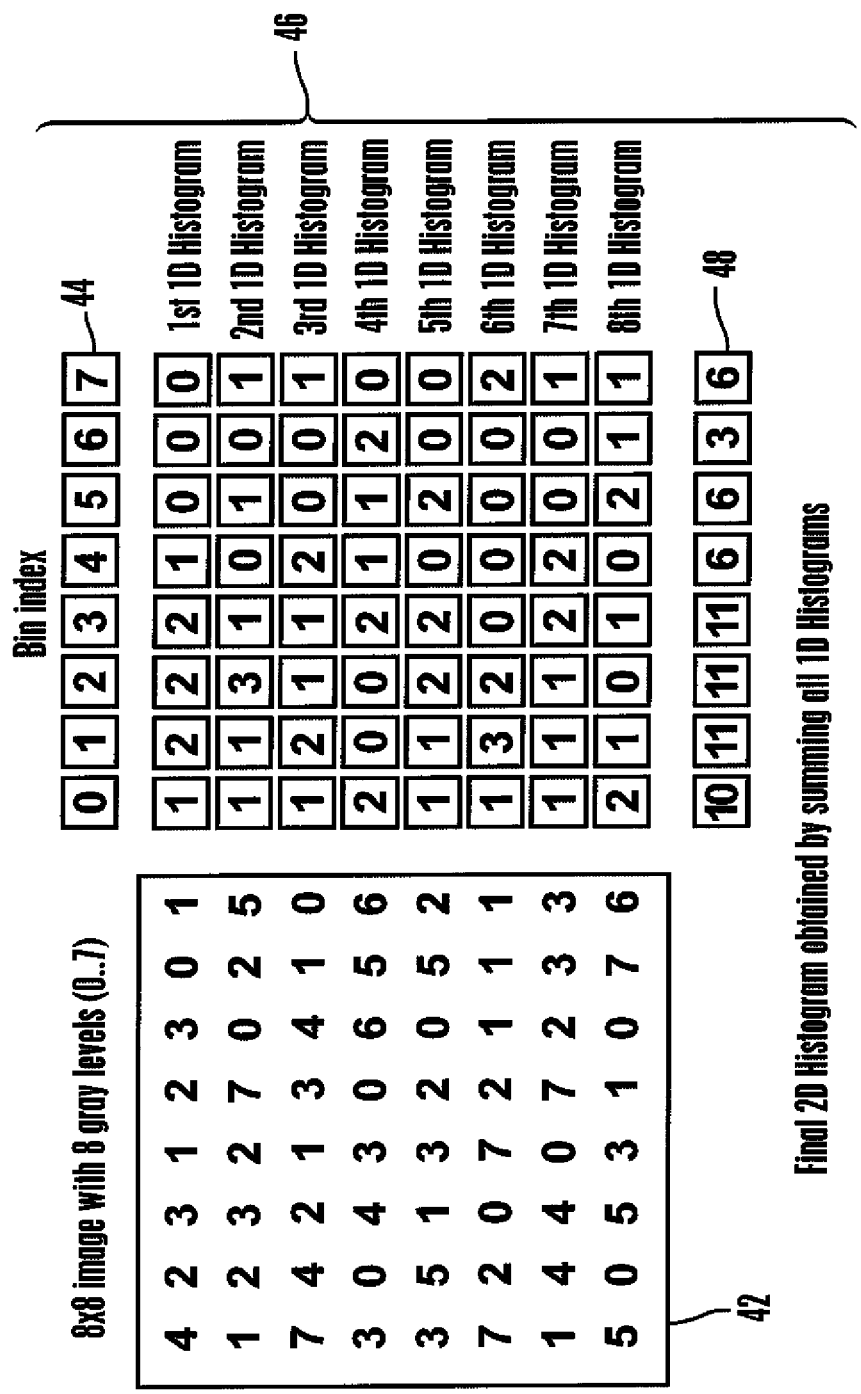
FIG. 3 is a schematic diagram illustrating 1D histogram calculation and 2D histogram derivation.

Referring initially to the non-limiting example embodiment shown in FIG. 1, a camera 10 includes a camera housing 12 such as a lightweight handheld housing with a processor 14 accessing a tangible computer readable storage medium 16 such as disk-based or solid state storage. Preferably, when the processor 14 is used to execute logic below, the processor 14 is a parallel processor for determining multiple one dimensional (1D) histograms simultaneously, i.e., in parallel. In example embodiments the processor 14 includes a graphics processing unit (GPU) such as those made by nVIDIA, AMD, or Intel and may use OpenCL or CUDA programming. In other embodiments the processor 14 communicates, over a wide area network 18 such as the Internet by means of a network interface 20 such as a wired or wireless modem or wireless telephony transceiver, with one or more other processors/display systems 22, which execute the logic below in lieu of or in cooperation with the processor 14.

In any case, the camera 10 includes an imager 24 such as but not limited to a charge coupled device (CCD), and the imager 24 sends signals to the processor 14 representing images. The processor 14 may present these images on a display 26. A shutter button 28 may be used according to principles known in the art to control a camera shutter 30 to expose the imager 24 to light from outside the housing 12. If desired, in some modes the shutter button 28 may be controlled by the processor 14.

FIG. 2 shows example overall logic that begins at block 32 to establish the size and if desired the shape of the histogram window, also referred to as the "kernel". For purposes of disclosure FIG. 3, which graphically illustrates logic principles shown in FIG. 2, assumes a rectangular window. Then, at block 34 using the pixels underlying the histogram window (in some embodiments, for each entire row of pixels of the image), a one-dimensional histogram (1D) is determined. The row histogram is 1D owing to it representing only a single row of pixels. Advantageously, the 1D histograms are determined simultaneously in parallel with each other while still providing a 0(1) complexity.

Proceeding to block 36, for the current window the 1D rows are summed together to render a 2D histogram. The summing is by column, i.e., the first value in each 1D histogram is added to the first values in the other 1D histograms, the second values are added together, etc.

Since histograms are determined for each image pixel, the window is shifted one pixel at block 38 by adding a new pixel and removing a previous pixel based on the horizontal radius of the window, rendering a new 1D histogram. Thus, if the window shifts right, a new pixel is added to the right-most element and the formerly left-most pixel is removed, and then the histogram determined.

Note that the initial histogram accounts for the desired window size. Therefore, as the histogram is shifted pixel by pixel, updated histograms are obtained for new image locations which reflect a histogram of the same size as the original size. For example, assume a beginning forty pixel long 1-D histogram for a window centered at image location (20, 20), which renders a 40 pixel Histogram. When the window is shifted one pixel to a new image location (21, 20), and the 1-D histogram updated, once again the new histogram is 40 pixels in length, albeit advantageously obtained much more quickly by this incremental approach in which one pixel is deleted from the left of the starting histogram and one pixel added to the right, making algorithm execution speed independent of the window size.

Likewise, at block 40 a new 2D histogram is determined by adding the new 1D histogram, removing an old 1D histogram, and adding the remaining 1D histograms together. When the new 1D histogram is added to the top of a column of 1D histograms, the bottom-most 1D histogram is removed.

FIG. 3 illustrates. A window of pixels is shown at 42, which assumes, for simplicity of disclosure, that each pixel has a value of between 0 and 7. A bin index is shown at 44, which lists the possible pixels values in ascending order from left to right. A series of 1D histograms is shown at 46, in which the frequency of each value in the bin index for the associated row of pixels in the window 42 appears. Thus, because only a single pixel in the top row of the window 42 has a value of 0, a "1" is entered in the first field of the first 1D histogram, representing the bin for the pixel value "0". Two pixels in the top row of the window 42 have a value of 1, so the numeral "2" is entered in the second field of the first 1D histogram, and so on. The 1D histograms thus represent the frequency with which each possible pixel value appears in the corresponding pixel window 42 rows.

Once each row of the pixel window 42 has had a corresponding 1D histogram 46 determined according to the above, the 1D histograms are summed by column, i.e., the bin indices "0" of all 1D histograms are summed together, the bin indices "1" of all 1D histograms are summed together, and so on to render the 2D histogram 48. Various values may be obtained as discussed further below from this 2D histogram, including median value, maximum value, and minimum value, and then one of these values can be used to replace the actual value of an associated pixel to reduce the effects of noise or to achieve an artistic effect.

As mentioned above, the window or kernel need not be rectangular, but instead can be circular, ovular, or other shape. Circular-like shapes such as Gaussian shapes may be more desirable for purposes of noise correction without causing edge artifacts. Principles underlying the derivation of a Gaussian shaped kernel, used as an example, can be found in *The Scientist's and Engineer's Guide to Digital Signal Processing*, Smith, California Technical Publishing 1999-2011, incorporated herein by reference. In general, the value of each pixel in the image is set equal to a corresponding point in a horizontal projection of the image multiplied by the corresponding point in a vertical projection of the image.

Commencing at block 50, the image is separated into vertical and horizontal projections or profiles. This may be done by generating arbitrary horizontal and vertical projections, and finding the image that corresponds to them.

Moving to block 52, the image is convolved with a separable filter kernel by convolving each row in the image with the horizontal projection, resulting in an intermediate image. Also, each column of this intermediate image is convolved with the vertical projection. The resulting image is identical to the direct convolution of the original image and the filter kernel. If desired, at block 54 the image can be convolved several times to approximate a Gaussian form.

FIG. 5 shows example logic for determining a median value and FIGS. 6 and 7 illustrate this logic and extend it to deriving minima and maxima as well. Commencing at block 56, a prefix sum is calculated based on the histograms discussed above and then at block 58 a median is calculated using the prefix sum and the histogram.

With more specificity and now referring to FIG. 6, assume the 2D histogram 60 has been derived according to disclosure above. At 62 each histogram bin in the 2D histogram is added to the sum of the previous bin to yield the prefix sum indicated at 64. Alternatively, the prefix sums of each 1D histogram can be added together in parallel and simultaneously with determining the 1D histograms, avoiding a temporally separate step of block 56.

Whether determined as a temporally separate step or in parallel with deriving the 1D histograms, the prefix sum 64 in FIG. 6 is used in FIG. 7 to determine a median, or a maximum, or a minimum which can then be applied to the relevant pixel or pixels to reduce noise in the image or to achieve artistic effects in the image. When determining the median, the sum of the bin values indicated at 68, in this case, 64, is divided by two to render a working sum. When determining the minimum the sum of the bin values is set equal to zero (working sum=0) and when determining the maximum the sum of the bin values is left unchanged (working sum=sum of the bin values).

Assuming the median is sought, in parallel for every bin element two conditions are evaluated, namely, whether the working sum is less than or equal to the prefix sum value for that bin element, and whether the difference between the prefix sum value for that bin element and the histogram value for that bin element (indicated at 70) is less than or equal to the working sum. Only one bin element will return "true" for both conditions, and that bin element is the sought-after value, in the case shown in FIG. 7, the median.

The following explanation with pseudocode illustrates.

Minimum, median, and maximum values may be obtained by simply setting the value of flOffset below to 0.0, 0.5 and 1.0 respectively. If is less than 0.5 (not Median or Max) then the equality is switched:

```
int total_sum    = prefixSum[255];
int median_val   = total_sum * flOffset;
int4 my_hist     = *(_local int4*) &hist[local_id*4];
int4 my_prefix_sum = *(_local int4*) &prefixSum[local_id*4];
int4 found_value;
int4 median      = (int4)(local_id*4, local_id*4 + 1,
   local_id*4 + 2, local_id*4 + 3);
if (flOffset<0.5f)
   found_value = ((int4)median_val < my_prefix_sum) &&
( my_prefix_sum-my_hist <= (int4)median_val);
   else
   found_value = ((int4)median_val <= my_prefix_sum) &&
( my_prefix_sum-my_hist < (int4)median_val);
```

Other functions which lie between minimum, median, and maximum can also be found by setting flOffset above to other than 0.0, 0.5, 1.0 values. So, for example, a value of 0.25 creates an effect that is between minimum and median.

The offset parameter in median ranges from 0.0 to 0.1.

In addition to the above, explanation is now provided as to an example non-limiting method for creating and updating histograms and also prefix sums. Assume a simple example of an 8-bit histogram in which are 256 bins. In one example, 256 parallel processors are assigned to complete this task to make the process very parallel and very efficient. Each one of the 256 processors is responsible for just one histogram bin and one prefix sum bin:

Processor P0 is responsible for updating bin 0 of histograms and prefix sums.
Processor P1 is responsible for updating bin 1 of histograms and prefix sums.
Processor P2 is responsible for updating bin 2 of histograms and prefix sums.
. . . .
Processor P255 is responsible for updating bin 255 of histograms and prefix sums.

In this example, the creation and update of histograms is as follows:

All 256 parallel processors read a new pixel.
Each processor checks the value (grayscale or color or whatever a pixel is) of this new pixel to see it is EQUAL to the bin that is assigned to
By definition only one processor would match the value of the new pixel to its bin.
This processor would have to increment the bin by unity (1).
Repeat for all pixels that belong to the histogram.

The creation and update of prefix sums is similar as for histograms but with the exception that all bins greater than current pixels are incremented to maintain cumulative histograms:

All 256 parallel processors read a new pixel.
Each processor checks the value (grayscale or color or whatever a pixel is) of this new pixel to see if is EQUAL or GREATER its bin that is assigned to
The processors that satisfy the above condition would have to increment their bin by 1.
Repeat for all pixels that belong to the histogram.

In this way a complete histogram for a given window may be calculated.

While the particular DERIVING MULTIDIMENSIONAL HISTOGRAM FROM MULTIPLE PARALLEL-PROCESSED ONE-DIMENSIONAL HISTOGRAMS TO FIND HISTOGRAM CHARACTERISTICS EXACTLY WITH O(1) COMPLEXITY FOR NOISE REDUCTION AND ARTISTIC EFFECTS IN VIDEO is herein shown and described in detail, it is to be understood that the subject matter which is encompassed by the present invention is limited only by the claims.

What is claimed is:

1. Computer comprising:
   processor;
   computer readable storage medium accessible to the processor and bearing instructions executable by the processor to cause the processor to:
   generate plural one-dimensional histograms using respective rows of pixel values in an image;
   generate a two-dimensional histogram using the one-dimensional histograms;
   determine at least one characteristic value of the two-dimensional histogram; and
   apply the characteristic value to the image to change at least one pixel value of the image, wherein the instructions when executed by the processor configure the processor to determine the characteristic value using at least first and second evaluations of each bin element of a one dimensional histogram.

2. The computer of claim 1, wherein the characteristic value is a median.

3. The computer of claim 1, wherein the characteristic value is a maximum.

4. The computer of claim 1, wherein the characteristic value is a minimum.

5. The computer of claim 2, wherein at least some pixels represented in the two-dimensional histogram are changed to respective median values.

6. The computer of claim 1, wherein the first evaluation includes determining whether a working sum that is based on a sum of pixel values is less than or equal to a prefix sum value for a bin element, and the second evaluation includes determining whether a difference between the prefix sum value for a bin element and a histogram value for a bin element is less than or equal to the working sum.

7. The computer of claim 6, wherein the characteristic value is a value returning "true" for both evaluations.

8. The computer of claim 6, wherein the prefix sum is determined by adding each histogram bin in the two-dimensional histogram to a sum of the previous bin.

9. The computer of claim 8, wherein prefix sums of each one dimensional histogram are added together in parallel and simultaneously with determining the one dimensional histograms.

10. The computer of claim 1, wherein the two-dimensional histogram is circular or ovular, and is generated by summing weighted versions of the one-dimensional histograms.

11. The computer of claim 1, wherein the processor is embodied in a camera.

12. Method comprising:
   determining one dimensional (1D) histograms, one for each row of an image;
   adding the 1D histograms together to determine a two dimensional (2D) histogram; and determining at least one desired characteristic value from the 2D histogram at least in part by determining whether a working sum that is based on a sum of pixel values is less than or equal to a prefix sum value for a bin element, and determining whether a difference between the prefix sum value for a bin element and a histogram value for a bin element is less than or equal to the working sum.

13. The method of claim 12, comprising applying the characteristic value to the image to reduce noise or to achieve artistic effects in the image.

14. The method of claim 12, wherein the characteristic value is a median.

15. The method of claim 12, wherein the characteristic value is a minimum.

16. The method of claim 12, wherein the characteristic value is a maximum.

17. Imaging assembly comprising:
imager;
processor configured for receiving signals from the imager representing at least one image;
computer readable storage medium accessible to the processor and bearing instructions which when executed by the processor cause the processor to:

determine one dimensional (1D) histograms based on the image simultaneously with each other;
determine a two dimensional (2D) histogram from the 1D histograms;
determine at least one desired characteristic value from the 2D histogram;
apply the characteristic value to the image, wherein the instructions when executed by the processor configure the processor to determine the characteristic value using at least first and second evaluations of each bin element of a one dimensional histogram, wherein the instructions when executed by the processor configure the processor to undertake the first evaluation at least in part by determining whether a working sum that is based on a sum of pixel values is less than or equal to a prefix sum value for a bin element, and the instructions when executed by the processor configure the processor to execute the second evaluation at least in part by determining whether a difference between the prefix sum value for a bin element and a histogram value for a bin element is less than or equal to the working sum.

* * * * *